United States Patent
Bishara et al.

(10) Patent No.: US 8,830,997 B1
(45) Date of Patent: *Sep. 9, 2014

(54) PREVENTING DENIAL-OF-SERVICE ATTACKS EMPLOYING BROADCAST PACKETS

(75) Inventors: Nafea Bishara, San Jose, CA (US); Tsahi Daniel, Palo Alto, CA (US); David Melman, D.N. Bikat Beit Hakerem (IL); Nir Arad, Nesher (IL)

(73) Assignees: Marvell International Ltd., Hamilton (BM); Marvell Israel (M.I.S.L) Ltd., Yokneam (IL)

( * ) Notice: Subject to any disclaimer, the term of this patent is extended or adjusted under 35 U.S.C. 154(b) by 982 days.

This patent is subject to a terminal disclaimer.

(21) Appl. No.: 12/917,417

(22) Filed: Nov. 1, 2010

Related U.S. Application Data

(63) Continuation of application No. 11/196,961, filed on Aug. 4, 2005, now Pat. No. 7,826,447.

(60) Provisional application No. 60/693,245, filed on Jun. 22, 2005.

(51) Int. Cl.
*H04L 12/28* (2006.01)

(52) U.S. Cl.
USPC ........... 370/390; 370/389; 370/392; 370/312; 370/252; 726/2; 726/13

(58) Field of Classification Search
CPC . H04L 12/4641; H04L 63/1458; H04L 45/00; H04L 45/54
USPC .................. 370/389, 396, 392, 390, 397, 312
See application file for complete search history.

(56) References Cited

U.S. PATENT DOCUMENTS

| | | | |
|---|---|---|---|
| 5,617,421 A * | 4/1997 | Chin et al. ..................... | 370/402 |
| 5,923,654 A * | 7/1999 | Schnell ......................... | 370/390 |
| 6,260,073 B1 * | 7/2001 | Walker et al. ................. | 709/249 |
| 6,370,142 B1 * | 4/2002 | Pitcher et al. ................. | 370/390 |
| 7,032,031 B2 | 4/2006 | Jungck et al. | |
| 7,046,680 B1 * | 5/2006 | McDysan et al. ............. | 370/396 |
| 7,295,572 B1 * | 11/2007 | Haapala ........................ | 370/466 |
| 7,339,931 B2 * | 3/2008 | Takihiro et al. ............... | 370/392 |
| 7,523,483 B2 * | 4/2009 | Dogan et al. ........................ | 726/1 |
| 7,570,647 B2 * | 8/2009 | Miyachi ................... | 370/395.32 |
| 2003/0174711 A1 | 9/2003 | Shankar | |
| 2003/0236999 A1 | 12/2003 | Brustoloni | |
| 2004/0078485 A1 | 4/2004 | Narayanan | |
| 2004/0109452 A1 | 6/2004 | Takihiro et al. | |
| 2005/0198519 A1 | 9/2005 | Tamura et al. | |
| 2006/0080733 A1 | 4/2006 | Khosmood et al. | |

* cited by examiner

*Primary Examiner* — Rasheed Gidado

(57) ABSTRACT

A network device including a processor having an internet protocol (IP) address, and a processor port configured to communicate exclusively with the processor. The network device also includes a plurality of network ports configured to communicate with network nodes external to the network device. In addition, the network device includes a forwarding engine configured to selectively transfer packets (i) among the plurality of network ports, and (ii) between the processor port and the plurality of network ports; receive a broadcast packet from one of the plurality of network ports, the broadcast packet including a target IP address; and forward the broadcast packet to the processor, via the processor port, only when both (i) the broadcast packet is a control packet, and (ii) the target IP address of the broadcast packet matches the IP address of processor.

16 Claims, 4 Drawing Sheets

PREVENTING DENIAL-OF-SERVICE ATTACKS EMPLOYING BROADCAST PACKETS

CROSS-REFERENCE TO RELATED APPLICATIONS

This application is a continuation of U.S. patent application Ser. No. 11/196,961 (now U.S. Pat. No. 7,826,447) filed Aug. 4, 2005, which claims the benefit of U.S. Provisional Patent Application Ser. No. 60/693,245 filed Jun. 22, 2005, the disclosure thereof incorporated by reference herein in its entirety.

BACKGROUND

The present invention relates generally to data communications. More particularly, the present invention relates to preventing denial-of-service attacks employing broadcast packets.

SUMMARY

In general, in one aspect, the invention features an apparatus comprising a processor; a plurality of ports to transmit and receive packets of data, the plurality of ports comprising a processor port in communication with the processor, the packets comprising broadcast packets and multicast packets; a memory to store a table that associates the processor port with one or more Internet protocol (IP) addresses; and a forwarding engine to transfer the packets between the ports, to transfer each of the broadcast packets to the processor port only when the table associates a target IP address of the broadcast packet with the processor port, and to transfer each of the multicast packets to the processor port only when the table associates a target IP address of the multicast packet with the processor port.

The details of one or more implementations are set forth in the accompanying drawings and the description below. Other features will be apparent from the description and drawings, and from the claims.

Figure 1:
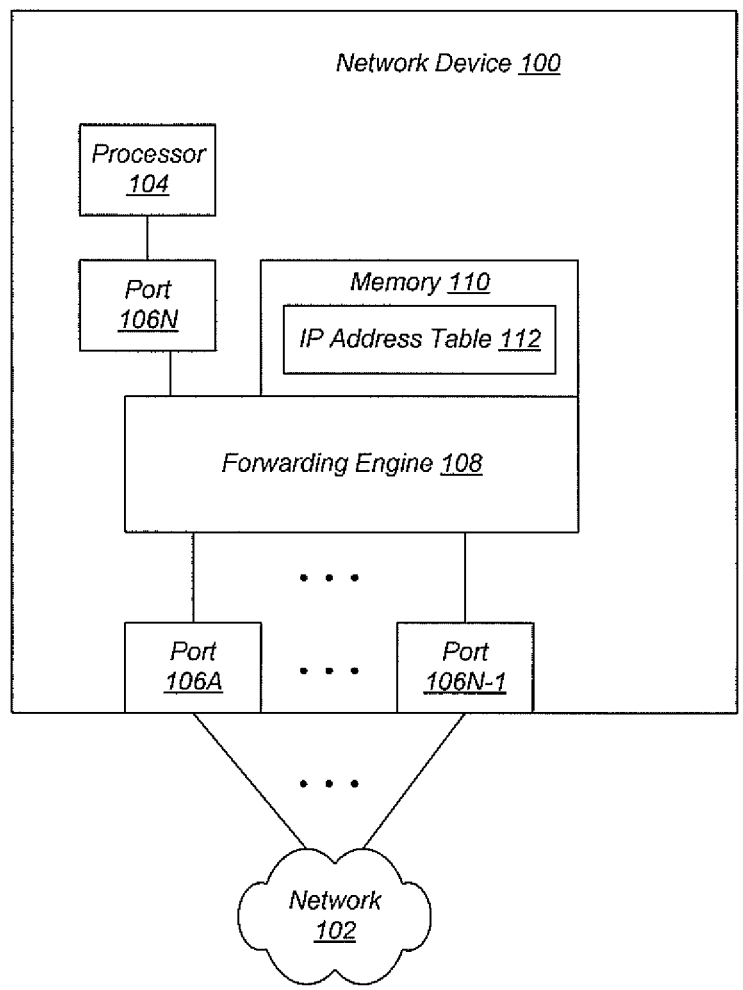
FIG. 1 shows a network device in communication with one or more networks according to a preferred embodiment.

The leading digit(s) of each reference numeral used in this specification indicates the number of the drawing in which the reference numeral first appears.

DETAILED DESCRIPTION

Data communications networks are the subject of increasingly numerous and sophisticated attacks. One type of attack is the denial-of-service attack in which an attacker overwhelms the management/host processor of a network device such as a switch with a high volume of traffic, thereby preventing the processor from attending to other protocol processing and data flows. One type of denial-of-service attack employs multicast and broadcast packets such as address resolution protocol (ARP) packets. In conventional switches, ARP request packets are always flooded to all ports within the flood domain (virtual local area networks (VLAN)). The host management processor in the switch or a router interfaces with the rest of the network for the purpose of protocol exchanges and remote management. In order for the host processor to do so, the processor must have one or more IP addresses, and must belong to one or more VLANs in the network. Because the processor is a member of the VLAN, it receives broadcast packets in the VLAN such as ARP request packets. In such switches, the processor is exposed to broadcast packets such as ARP request packets. Therefore an attacker can mount a denial-of-service attack upon a network by simply transmitting a large number of ARP request packets to the network and thereby burdening the host processor.

Embodiments of the present invention prevent denial-of-service attacks employing broadcast and multicast packets. According to preferred embodiments, no broadcast packets are sent to the processor except control packets such as ARP packets and dynamic host configuration protocol (DHCP) packets. According to some embodiments, a device such as a switch passes broadcast and multicast packets to the processor only when the IP address of the processor is the target of the packet. According to some embodiments, the device passes ARP requests to the processor only when the processor has the IP address that is the target of the ARP request and belongs to the VLAN that is associated with the ARP request.

FIG. 1 shows a network device 100 in communication with one or more networks 102 according to a preferred embodiment. Network device 100 comprises a processor 104, a plurality of ports 106A-N to transmit and receive packets of data, the plurality of ports comprising a processor port 106N in communication with processor 104, a forwarding engine 108 to transfer the packets between ports 106, and a memory 110 to store an IP address table 112. In various embodiments, network device 100 can be implemented as a data link layer switch, a multi-layer switch, a router, and the like.

Figure 2:
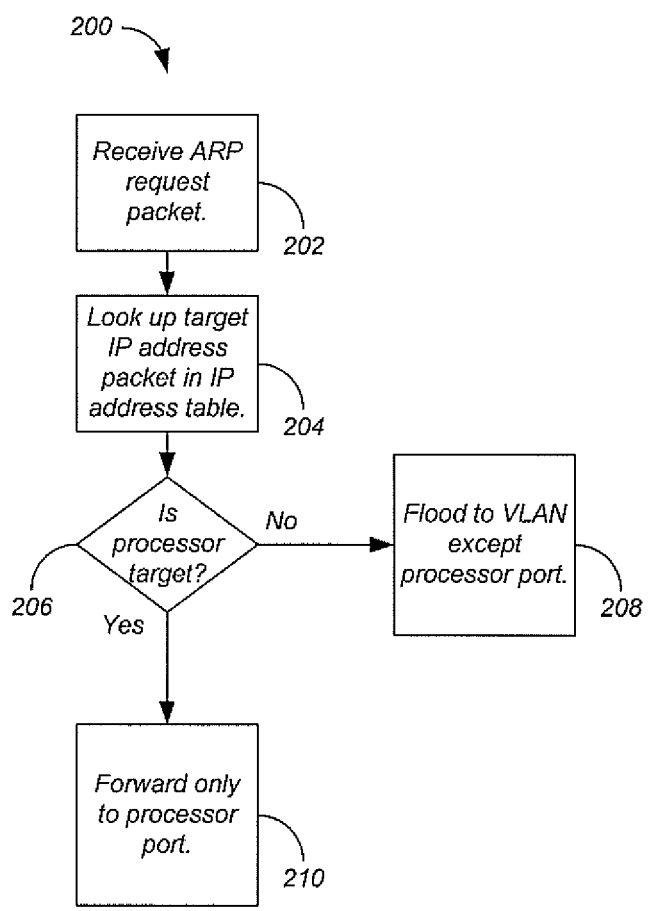
FIG. 2 shows a process for the network device of FIG. 1 for limiting access of ARP request packets to the processor using a dedicated IP address table according to a preferred embodiment.

FIG. 2 shows a process 200 for network device 100 of FIG. 1 for limiting access of ARP request packets to processor 104 using dedicated IP address table 112 according to a preferred embodiment. While embodiments of the present invention are described with reference to ARP packets, embodiments of the present invention apply to any broadcast or multicast packet, as will be apparent to one skilled in the relevant arts after reading this description. Network device 100 receives an ARP request packet (step 202). Each ARP request packet comprises a target IP address for which the corresponding media access control (MAC) address is sought, as is well-known in the relevant arts. ARP request packets are generally transmitted as broadcast or multicast packets. However, according to embodiments of the present invention, access to processor 104 by ARP request packets is limited by the techniques described below.

Forwarding engine 108 looks up the target IP address of the ARP request packet in IP address table 112 (step 204). Based on the lookup, forwarding engine 108 determines whether the ARP request packet is directed to processor 104 (step 206). In a data link layer switch IP address table 112 can be dedicated to limiting ARP floods. In devices having network layer capabilities, such as a multi-layer switch or router, the existing IP forwarding table can be used as table 112. If the IP address of processor port 106N is the same as the target IP address of the ARP request packet, then processor 104 is the target of the ARP request packet, and forwarding engine 108 forwards the ARP request packet only to processor port 106N (step 210).

Otherwise forwarding engine 108 floods the ARP request packet within the VLAN except to processor port 106N (step 208).

In some embodiments employing VLANs, ARP request packets are forwarded to processor 104 only when processor 104 is the target of the ARP request packet and the ARP request packet is associated with the same VLAN as processor 104. According to these embodiments, forwarding engine 108 optionally determines whether the ARP request packet is associated with the same VLAN as processor 104. In some embodiments, IP address table 112 associates processor port 106N with one or more VLANs. If the ARP request packet is not associated with the same VLAN as processor 104, forwarding engine 108 optionally removes processor port 106N from the destination port list of the ARP request packet. Finally, forwarding engine 108 floods the ARP request packet according to its destination port list.

Figure 3:
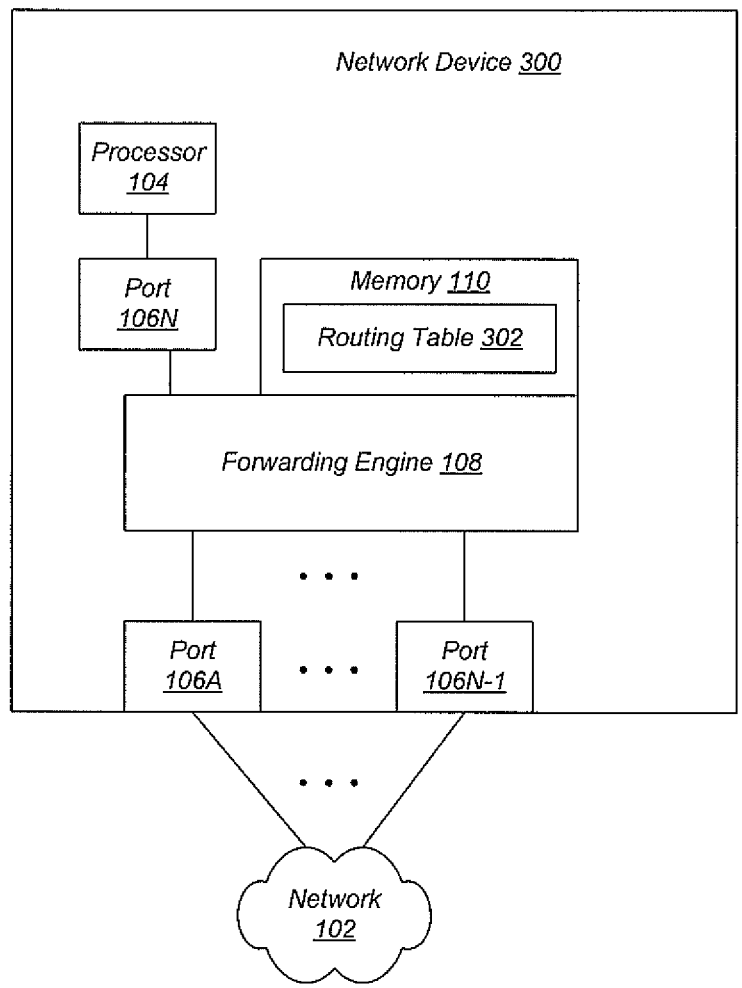
FIG. 3 shows a network device in communication with one or more networks according to a preferred embodiment.

FIG. 3 shows a network device 300 in communication with one or more networks 102 according to a preferred embodiment. Network device 300 comprises a processor 104, a plurality of ports 106A-N to transmit and receive packets of data, the plurality of ports comprising a processor port 106N in communication with processor 104, a forwarding engine 108 to transfer the packets between ports 106 according to a routing table 302, and a memory 110 to store routing table 302. In various embodiments, network device 300 can be implemented as a multi-layer switch, a router, and the like.

Figure 4:
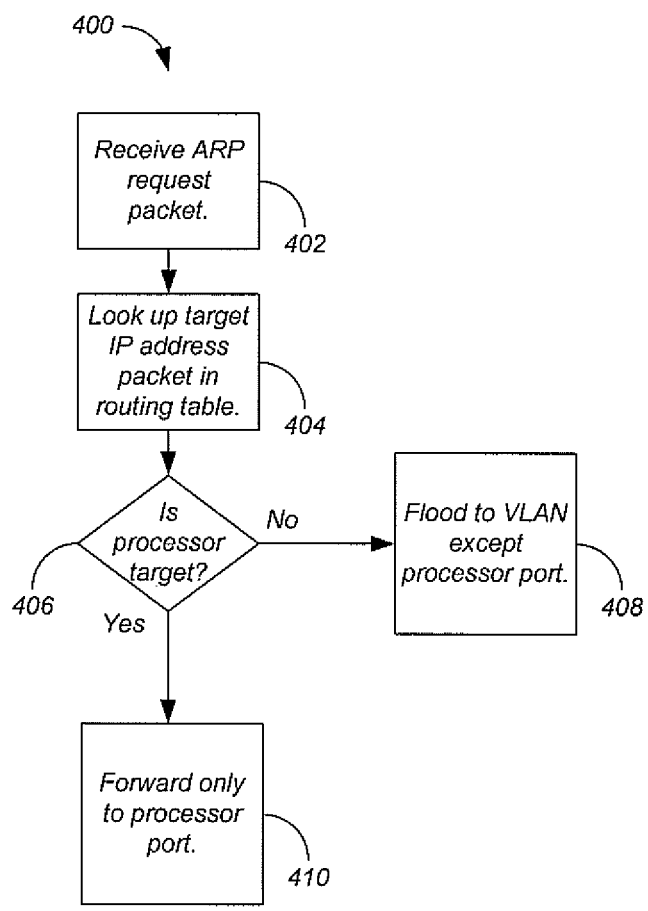
FIG. 4 shows a process for the network device of FIG. 3 for limiting access of ARP request packets to the processor using a routing table according to a preferred embodiment.

FIG. 4 shows a process 400 for network device 300 of FIG. 3 for limiting access of ARP request packets to processor 104 using routing table 302 according to a preferred embodiment. Network device 300 receives an ARP request packet (step 402). According to embodiments of the present invention, access to processor 104 by ARP request packets is limited by the techniques described below.

Forwarding engine 108 looks up the target IP address of the ARP request packet in routing table 302 (step 404). Forwarding engine 108 determines whether the ARP request packet is directed to processor 104 (step 406) according to routing table 302, which associates each of ports 106 with one or more IP addresses, as is well-known in the relevant arts. If the IP address of processor port 106N is the same as the target IP address of the ARP request packet, then processor 104 is the target of the ARP request packet, and forwarding engine 108 forwards the ARP request packet only to processor port 106N (step 410). Otherwise forwarding engine 108 floods the ARP request packet within the VLAN except to processor port 106N (step 408).

In some embodiments employing VLANs, ARP request packets are forwarded to processor 104 only when processor 104 is the target of the ARP request packet and the ARP request packet is associated with the same VLAN as processor 104. According to these embodiments, forwarding engine 108 optionally determines whether the ARP request packet is associated with the same VLAN as processor 104, for example using routing table 302. If the ARP request packet is not associated with the same VLAN as processor 104, forwarding engine 108 optionally removes processor port 106N from the destination port list of the ARP request packet. Finally, forwarding engine 108 floods the ARP request packet according to its destination port list.

Some embodiments provide additional protection against ARP-based denial-of-service attacks by applying the technique of FIG. 4 to all of the ports 106 of network device 300. That is, forwarding engine 108 transfers each ARP request packet only to the port 106 that is associated with the target IP address of the ARP request packet. In some embodiments, forwarding engine 108 transfers each ARP request packet only to the port 106 that is associated with the target IP address of the ARP request packet, and only when the VLANs associated with the port 106 and the ARP request packet are the same.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device, comprising:
   a processor having an internet protocol (IP) address;
   a processor port configured to communicate exclusively with the processor;
   a plurality of network ports configured to communicate with network nodes external to the network device; and
   a forwarding engine configured to
      selectively transfer packets (i) among the plurality of network ports, and (ii) between the processor port and the plurality of network ports,
      receive a broadcast packet from one of the plurality of network ports, the broadcast packet including a target IP address,
      forward the broadcast packet to the processor, via the processor port, only when both (i) the broadcast packet is a control packet, and (ii) the target IP address of the broadcast packet matches the IP address of the processor, and
      inhibit the forwarding of the broadcast packet to the processor unless a virtual local area network (VLAN) identifier of the broadcast packet matches a VLAN identifier assigned to the processor.

2. The network device of claim 1, further comprising:
a memory configured to store an IP address table that associates at least one VLAN identifier with the processor,
wherein the forwarding engine is configured to determine whether the VLAN identifier of the broadcast packet matches any one of the at least one VLAN identifier as set forth in the IP address table.

3. The network device of claim 1, wherein the forwarding engine is configured to:
receive a multicast packet from one of the plurality of network ports, the multicast packet having a target IP address; and
forward the multicast packet to the processor, via the processor port, only when both (i) the multicast packet is a control packet and (ii) the target IP address of the multicast packet matches the IP address of the processor.

4. The network device of claim 3, wherein the forwarding engine is configured to determine that the multicast packet is a control packet when the multicast packet is at least one of: (i) an address resolution protocol (ARP) packet, (ii) a dynamic host configuration protocol (DHCP) packet, or (iii) a user datagram protocol (UDP) datagram.

5. The network device of claim 1, wherein the forwarding engine is configured to determine that the broadcast packet is a control packet in response to the broadcast packet being at least one of: (i) an address resolution protocol (ARP) packet, (ii) a dynamic host configuration protocol (DHCP) packet, or (iii) a user datagram protocol (UDP) datagram.

6. The network device of claim 1, further comprising a memory configured to store an IP address table that associates the IP address with the processor, wherein the forwarding engine is configured to determine whether the target IP address of the broadcast packet matches the IP address of the processor as set forth in the IP address table.

7. A switch, comprising the network device of claim 1.

8. A router, comprising the network device of claim 1.

9. A method of operating a network device, the method comprising:
communicating with a processor of the network device exclusively via a processor port, the processor having an internet protocol (IP) address;
communicating with network nodes external to the network device via a plurality of network ports;
selectively transferring packets (i) among the plurality of network ports, and (ii) between the processor port and the plurality of network ports;
receiving a broadcast packet from one of the plurality of network ports, the broadcast packet having a target IP address;
forwarding the broadcast packet to the processor only when both (i) the broadcast packet is a control packet and (ii) the target IP address of the broadcast packet matches the IP address of the processor; and
inhibiting the forwarding of the broadcast packet to the processor unless a virtual local area network (VLAN) identifier of the broadcast packet matches a VLAN identifier assigned to the processor.

10. The method of claim 9, further comprising:
storing an IP address table that associates at least one VLAN identifier with the processor; and
determining whether the VLAN identifier of the broadcast packet matches any one of the at least one VLAN identifier as set forth in the IP address table.

11. The method of claim 9, further comprising:
receiving a multicast packet from one of the plurality of network ports, the multicast packet having a target IP address; and
forwarding the multicast packet to the processor, via the processor port, only when both (i) the multicast packet is a control packet and (ii) the target IP address of the multicast packet matches the IP address of the processor.

12. The method of claim 11, further comprising determining that the multicast packet is a control packet in response to the multicast packet being at least one of: (i) an address resolution protocol (ARP) packet, (ii) a dynamic host configuration protocol (DHCP) packet, or (iii) a user datagram protocol (UDP) datagram.

13. The method of claim 9, further comprising determining that the broadcast packet is a control packet when the broadcast packet is at least one of: (i) an address resolution protocol (ARP) packet, (ii) a dynamic host configuration protocol (DHCP) packet, or (iii) a user datagram protocol (UDP) datagram.

14. The method of claim 9, further comprising:
storing an IP address table that associates the IP address with the processor; and
determining whether the target IP address of the broadcast packet matches the IP address of the processor as set forth in the IP address table.

15. The method of claim 9, further comprising, when forwarding the broadcast packet to the processor, forwarding the broadcast packet only to the processor.

16. The method of claim 9, further comprising flooding the broadcast packet to all but one of the plurality of ports in response to (i) the broadcast packet not being a control packet or (ii) the target IP address of the broadcast packet not matching the IP address of the processor.

* * * * *